US009683561B2

(12) United States Patent
Rühle et al.

(10) Patent No.: US 9,683,561 B2
(45) Date of Patent: Jun. 20, 2017

(54) DRIVE TRAIN COOLING ARRANGEMENT AND METHOD FOR OPERATING SAME

(71) Applicant: GETRAG Getriebe- und Zahnradfabrik Hermann Hagenmeyer GmbH & Cie KG, Untergruppenbach (DE)

(72) Inventors: Günter Rühle, Löchgau (DE); Alexander Kiehlneker, Flein (DE)

(73) Assignee: GETRAG GETRIEBE- UND ZAHNRADFABRIK HERMANN HAGENMEYER GMBH & CIE KG, Untergruppenbach (DE)

( * ) Notice: Subject to any disclaimer, the term of this patent is extended or adjusted under 35 U.S.C. 154(b) by 408 days.

(21) Appl. No.: 14/261,487

(22) Filed: Apr. 25, 2014

(65) Prior Publication Data

US 2014/0234124 A1 Aug. 21, 2014

Related U.S. Application Data

(63) Continuation of application No. PCT/EP2012/072058, filed on Nov. 7, 2012.

(30) Foreign Application Priority Data

Nov. 9, 2011 (DE) .................. 10 2011 118 574

(51) Int. Cl.
*F01P 7/04* (2006.01)
*F01P 7/08* (2006.01)
(Continued)

(52) U.S. Cl.
CPC .............. *F04B 35/002* (2013.01); *F01P 5/10* (2013.01); *F01P 7/165* (2013.01);
(Continued)

(58) Field of Classification Search
CPC ........ F01P 7/165; F01P 5/12; F01P 2005/125; F01P 7/164; F01P 5/10; F01P 2005/105; F16D 2048/0248
See application file for complete search history.

(56) References Cited

U.S. PATENT DOCUMENTS 4,554,891 A 11/1985 Hayashi
5,894,825 A 4/1999 Duerr
(Continued)

FOREIGN PATENT DOCUMENTS

CN 101589212 11/2009
CN 101809262 8/2010
(Continued)

OTHER PUBLICATIONS

International Preliminary Report on Patentability dated May 22, 2014, 10 pages.
(Continued)

*Primary Examiner* — Peter J Bertheaud
(74) *Attorney, Agent, or Firm* — Reising Ethington P.C.

(57) ABSTRACT

A drive train cooling arrangement for motor vehicles has a first cooling circuit and a second cooling circuit and has a pump arrangement, by means of which coolant can be fed to the first and the second cooling circuit. The pump arrangement has a bidirectional pump, which has a first pump port and a second pump port and which can be driven by a pump electric motor. The first pump port is connected to the first cooling circuit, wherein the second pump port is connected to the second cooling circuit. A coolant volume flow which is provided for at least one of the first and the second cooling circuit can be adjusted by changing the rotational speed of the pump electric motor.

13 Claims, 1 Drawing Sheet

(51) Int. Cl.
  *F01P 7/14* (2006.01)
  *F01P 5/10* (2006.01)
  *F01P 5/12* (2006.01)
  *F04B 35/00* (2006.01)
  *F01P 7/16* (2006.01)
  *F16H 57/04* (2010.01)
  *F16D 48/02* (2006.01)
  *F01P 3/00* (2006.01)

(52) U.S. Cl.
  CPC ..... *F16H 57/0413* (2013.01); *F16H 57/0441* (2013.01); *F16H 57/0473* (2013.01); *F16H 57/0476* (2013.01); *F01P 5/12* (2013.01); *F01P 2003/006* (2013.01); *F01P 2005/125* (2013.01); *F01P 2050/24* (2013.01); *F01P 2060/045* (2013.01); *F16D 2048/0248* (2013.01)

(56) References Cited

U.S. PATENT DOCUMENTS

| | | | |
|---|---|---|---|
| 5,901,802 A | 5/1999 | Sunohara et al. | |
| 7,000,574 B2* | 2/2006 | Ahner | B60H 1/03 123/41.12 |
| 7,951,043 B2* | 5/2011 | Reisch | F16H 57/0434 192/113.3 |
| 8,151,965 B2* | 4/2012 | Linortner | B60K 17/35 192/103 F |
| 8,281,753 B2 | 10/2012 | Shintani | |
| 8,316,806 B2 | 11/2012 | Söederberg | |
| 8,439,805 B2 | 5/2013 | Grundler et al. | |
| 2004/0045749 A1 | 3/2004 | Jaura et al. | |
| 2014/0080650 A1 | 3/2014 | Rühle | |
| 2014/0080666 A1 | 3/2014 | Rühle | |

FOREIGN PATENT DOCUMENTS

| | | |
|---|---|---|
| DE | 19925986 A1 | 12/2000 |
| DE | 102004058869 A1 | 6/2006 |
| DE | 102007038156 A1 | 2/2009 |
| DE | 102009001110 A1 | 8/2010 |
| DE | 102011102267 A1 | 11/2012 |
| DE | 102011102277 A1 | 11/2012 |
| GB | 2108262 A | 5/1983 |
| JP | S59130764 A | 7/1984 |
| JP | 10115291 A | 6/1998 |
| WO | WO03106825 A1 | 12/2003 |

OTHER PUBLICATIONS

German Office Action for application No. 102011118574.0, dated Feb. 8, 2016, 6 pages.
German Search Report dated Jun. 11, 2012, 5 pages.
International Search Report and Written Opinion dated Feb. 27, 2013, 13 pages.
Chinese Office Action for Application No. 201280054496.x dated Nov. 26, 2015, 8 pages.
English Translation of Chinese Office Action for Application No. 201280054496.x dated Nov. 26, 2015, 11 pages.
European Search Report for Application No. 12786944.4 dated Mar. 9, 2017, 4 pages.

* cited by examiner

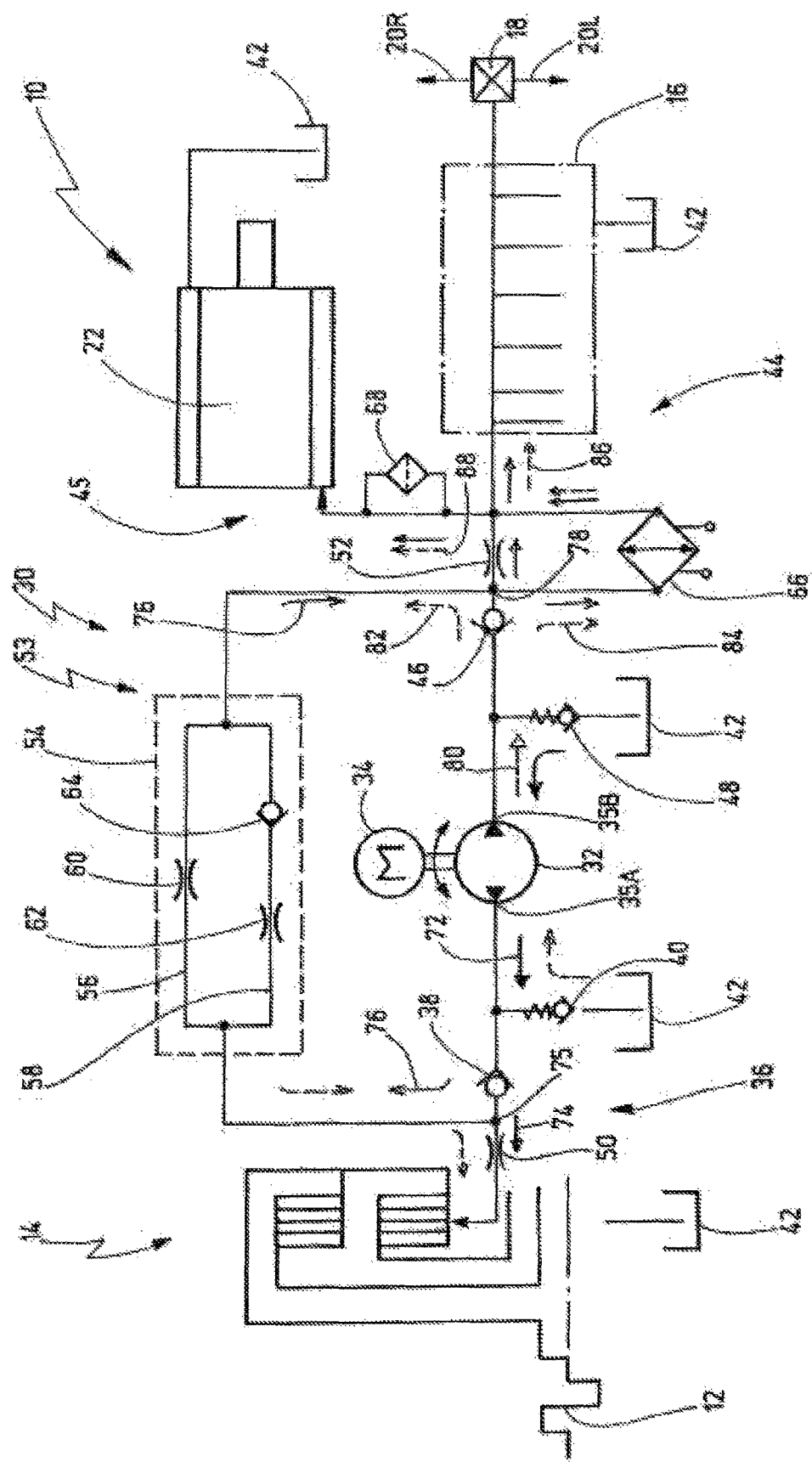

DRIVE TRAIN COOLING ARRANGEMENT AND METHOD FOR OPERATING SAME

CROSS REFERENCES TO RELATED APPLICATIONS

This application is a Continuation application of International patent application PCT/EP 2012/072058, filed Nov. 7, 2012, claiming priority of German patent application DE 10 2011 118 574.0, filed Nov. 9, 2011.

BACKGROUND OF THE INVENTION

The present invention relates to a drive train cooling arrangement for motor vehicles, having a first cooling circuit and a second cooling circuit and having a pump arrangement, by means of which coolant can be fed to the first and the second cooling circuit.

The present invention furthermore relates to a method for operating a cooling arrangement of this kind. There is a known practice in drive trains of motor vehicles of feeding cooling or lubricating oil to subassemblies of a transmission, such as bearings and gearing, by way of injection lubrication. In this case, a pump is generally provided in the region of a transmission sump, and this pump can be driven by means of a drive motor such as an internal combustion engine, for example.

It is furthermore a known practice in the area of drive trains to cool wet multiplate clutches of the kind often used in dual clutch transmissions, for example. In this case, a separate pump is used and is generally likewise coupled to a crankshaft, building up a pump pressure continuously in operation.

To cool such friction clutches, use is generally made of an automatic transmission fluid of relatively low viscosity, whereas "hypoid" oil with a higher viscosity is used for lubrication in many transmissions.

Here, a volume flow of such a cooling or lubricating fluid is generally supplied via electromagnetically controlled valve arrangements. Valves of this kind generally contain spool valves, which make great demands as regards cleanliness during manufacture and assembly.

In the case of drive trains for motor vehicles which additionally have an electric motor as a drive motor (hybrid drive trains), it may also be necessary to cool the electric motor. For this purpose, another cooling arrangement is provided, and this is likewise generally operated with automatic transmission fluid. In this case, an electrically driven coolant pump is generally provided to supply the electric drive motor with coolant in order to allow a purely electric drive mode as well.

SUMMARY OF THE INVENTION

Given the above background, it is an object of the invention to specify an improved drive train cooling arrangement and a method for operating same which can be produced at low cost, has a low energy consumption and/or is designed to supply two or more cooling circuits.

In the case of the drive train cooling arrangement mentioned at the outset, the above object is achieved by virtue of the fact that the pump arrangement has a bidirectional pump, which has a first pump port and a second pump port and which can be driven by a pump electric motor, wherein the first pump port is connected to the first cooling circuit, wherein the second pump port is connected to the second cooling circuit and wherein a coolant volume flow which is provided for the first and/or the second cooling circuit can be adjusted by changing the rotational speed of the pump electric motor.

The same coolant (preferably automatic transmission fluid) is therefore fed to the first and the second cooling circuit. Here, the coolant can perform a cooling function and/or a lubricating function, depending on the cooling circuit. For the sake of simplicity, the concept of cooling will essentially be used as a basis in the present case, but this can relate both to cooling and to lubrication of elements of the drive train in the context of the present application.

In the cooling arrangement according to the invention, the first cooling circuit can be supplied with a coolant volume flow when the bidirectional pump is driven in a first direction of rotation by means of the pump electric motor. The first pump port is then a pressure port and the second pump port is a suction port. In the second direction of rotation of the pump electric motor, the second pump port is a pressure port and the first pump port is a suction port in order in this way to make available a coolant volume flow to the second cooling circuit.

In most driving situations of motor vehicles, making available a coolant volume flow either to the first cooling circuit or to the second cooling circuit is sufficient. In many driving situations, however, it may be necessary to make coolant available to both cooling circuits simultaneously.

The above object is therefore likewise achieved by a method for operating a drive train cooling arrangement having a bidirectional pump and having a pump electric motor which drives the pump, in particular of the type described above, wherein the direction of rotation of the pump electric motor is changed at a frequency in a range of from $1/10$ Hz to 7 Hz.

Here, the frequency depends on the power to be transmitted, i.e. on the thermal and frictional loads which arise in different driving states.

By means of a relatively rapid change of this kind in the direction of rotation, it is therefore possible to supply both the first cooling circuit and the second cooling circuit substantially simultaneously with an adequate coolant volume flow in the particular driving situations described above.

The drive train cooling arrangement according to the invention furthermore makes it possible to integrate the cooling of different subassemblies of the drive train into the first and/or second cooling circuits, thus making it possible to implement a modular principle on the basis of the cooling arrangement according to the invention by connecting a number of subassemblies, each with their own cooling circuit, to the first and/or the second pump port. It is thereby possible to use substantially the same cooling arrangement for different drive trains, e.g. for a drive train without an electric drive motor and for a hybrid drive train.

By virtue of the fact that the cooling arrangement can be driven by means of the pump electric motor only when required, it furthermore has a good efficiency. In other words, the bidirectional pump is not necessarily driven while the vehicle is in operation (as when coupled to an internal combustion engine) but only when there is a requirement for cooling.

It is furthermore possible to adjust the level of cooling demand by adjusting the rotational speed of the pump electric motor. In the case of a low cooling demand, the pump electric motor can therefore be operated at a low rotational speed, and therefore its power consumption is likewise low. This also contributes to the good efficiency.

The arrangement comprising the bidirectional pump and the pump electric motor connected to the pump can be arranged at any point within or outside housings of the drive train and connected by coolant lines to the respective cooling circuits. Accordingly, the cooling arrangement can be adapted to a large number of transmissions or transmission installation situations.

Here, the drive train preferably has the bidirectional pump alone as the only coolant pump of the drive train.

It is furthermore preferred if the cooling arrangement does not have any electromagnetically controlled valves, in particular no spool valves. This makes it possible significantly to reduce the requirements as regards cleanliness during manufacture and assembly.

Moreover, the size of the pump and the size of the pump electric motor can be kept relatively small since both directions of rotation can be used to supply the cooling circuits.

In this case, the entire temperature management of the drive train can be adjusted in an optimum manner, independently of an internal combustion engine. The object is thus fully achieved.

It is particularly advantageous if the first and/or the second cooling circuit is/are connected to the respective pump port via a check valve.

This makes it easier to set up the first and/or second pump port as a suction port, depending on the direction of rotation.

According to another preferred embodiment, the first and/or the second pump port is/are connected to a low-pressure section, such as a tank, via a suction valve.

In this way, the first and/or second pump port can be set up as a suction port, depending on the direction of rotation, in which case coolant is drawn in from the low-pressure section via the respective suction valve. In the case where the same pump port is set up as a pressure port, the suction valve prevents delivery of fluid toward the low-pressure section. Here, the suction valve is preferably likewise designed as a check valve. The suction valve designed as a check valve is preferably a spring-loaded check valve.

According to an embodiment which is preferred overall, the first and the second cooling circuit are connected to one another via an orifice arrangement. On the one hand, an orifice arrangement of this kind can be used to ensure that, when the pump electric motor is driven in a first direction, in which the first pump port is designed as a pressure port and a coolant volume flow is made available to the first cooling circuit, the second cooling circuit is also supplied, via the orifice arrangement, with a certain coolant volume flow. Here, the orifice arrangement can be unidirectional, so that the second cooling circuit is always supplied with some of the volume flow fed to the first cooling circuit but that, when the direction of rotation is reversed, the first cooling circuit is not supplied with any of the coolant volume flow. However, it is preferred if the orifice arrangement acts bidirectionally, so that when one of the cooling circuits is supplied, the other cooling circuit is also supplied in each case with some of the volume flow delivered.

In this embodiment, it is preferred if the orifice arrangement is designed in such a way that the cross section in one direction of connection is different from the cross section in the second direction of connection.

Connecting the two cooling circuits via an orifice arrangement can furthermore have the advantage that this prevents either of the cooling circuits from ever running completely empty, giving rise to advantages as regards bleeding etc.

Moreover, it is possible to connect a cooler for cooling coolant only on the side of one of the pump ports. If, for example, the cooler is connected in the region of the second cooling circuit, and the pump is operated for a relatively long period of time only in such a way that the volume flow is delivered toward the first cooling circuit, some of the volume flow is always also fed to the cooler in the region of the second cooling circuit via the orifice arrangement, thereby making it possible to avoid excessive heating of the coolant.

In order to ensure that the cross-sectional area of the orifice arrangement in one direction of flow is different from that in the other direction of flow, it is preferred if the orifice arrangement has a check valve.

In particular, it is preferred if the orifice arrangement has two parallel branches, wherein a check valve is arranged in at least one of the branches and wherein an orifice is arranged in at least one of the branches.

It is particularly preferred if an orifice is arranged in one of the branches, and an orifice and a check valve are arranged in the other branch.

An orifice arrangement of this kind can also be combined structurally in a single element.

In the drive train cooling arrangement according to the invention, it is preferred if the first cooling circuit has a clutch cooling circuit, which can be used to cool a wet multiplate clutch or an assembly consisting of two wet multiplate clutches of a dual clutch transmission, for example.

It is furthermore preferred if the second cooling circuit has a transmission cooling circuit and/or an electric motor cooling circuit.

If a transmission of the drive train is to be supplied with coolant by means of an injection lubrication system, the second cooling circuit can have a transmission cooling circuit. If the drive train has an electric motor as a drive motor which is to be supplied with coolant, the second cooling circuit can have an electric motor cooling circuit in addition or as an alternative.

As described above, it is furthermore preferred if the second cooling circuit is connected to the second pump port via a coolant cooler.

It is thereby possible to ensure that the temperature of the coolant does not rise greatly.

According to another preferred embodiment, the first cooling circuit and/or the second cooling circuit has/have a bypass filter.

By means of such a filter, the purity of the coolant can be maintained for a relatively long time. Where there are rolling contact bearings in the transmission, this can make it possible to omit sealing washers and thus achieve a reduction in drag torques in the gearset, for example. It is thereby possible to increase efficiency etc.

The drive train cooling arrangement according to the invention provides a cooling concept that is suitable for modular construction. The cooling arrangement can furthermore be operated with a minimal demand for auxiliary power so as to meet future requirements relating to motor vehicle consumption. The cooling arrangement is preferably free from hydraulic valves, in particular electromagnetically operated valves and spool valves, and therefore the requirements relating to technical cleanliness in the fluid circuit are not high. In the simplest case, the drive train cooling arrangement can be used exclusively to cool an element of the drive train, e.g. a wet clutch arrangement. In this case, no assembly requiring cooling might be connected to the second cooling circuit, for example. The cooling of an electric motor, the coolant and/or lubricant supply to gearsets and/or bearings of a transmission, the supply to a cooler and/or the supply to a bypass filter can then preferably be implemented in a modular fashion in the region of the second pump port.

It is self-evident that the features mentioned above and those which remain to be explained below can be used not only in the respective indicated combination but also in other combinations or in isolation without exceeding the scope of the present invention.

BRIEF DESCRIPTION OF THE DRAWING

Exemplary embodiments of the invention are represented in the drawing and are explained in more detail in the following description. In the drawing:

The FIGURE shows a schematic illustration of a drive train for a motor vehicle having an embodiment of a drive train cooling arrangement according to the invention.

DESCRIPTION OF PREFERRED EMBODIMENTS

In the FIGURE, a drive train for a motor vehicle is shown schematically and is denoted overall by 10. The drive train 10 comprises a drive motor 12 (in the form of an internal combustion engine, for example) and a clutch arrangement 14. In the present case, the clutch arrangement 14 is formed by two wet multiplate clutches. However, the clutch arrangement 14 could also comprise just one wet multiplate clutch or, alternatively, more than the two multiplate clutches mentioned, e.g. within or on a differential.

The drive train 10 furthermore has a transmission, which can comprise two component transmissions, for example, in the case of a dual clutch transmission. Provided in the transmission is a plurality of gearsets, by means of which different transmission ratios can be set up. The transmission 16 is designed at least in part as an injection-lubricated transmission, e.g. by means of oil lines in shafts of the transmission.

One output of the transmission 16 is connected to a differential 18, by means of which the motive power can be distributed between driven wheels 20L, 20R of the motor vehicle.

The drive train 10 furthermore comprises a drive motor in the form of an electric motor 22. Consequently, the drive train 10 is designed as a hybrid drive train. The drive train 10 is preferably designed in such a way that the motor vehicle can be driven either by means of the internal combustion engine 12 or exclusively by means of the electric motor 22, or using the motive power from both the internal combustion engine 12 and from the electric motor 22.

In a variant of the drive train 10, it does not have an electric motor 22 in the form of a drive motor.

The drive train 10 furthermore comprises a cooling arrangement 30. The cooling arrangement 30 has a bidirectional pump 32, which is designed as a rotary pump and is connected to a pump electric motor 34. The pump electric motor 34 can drive the pump 32 in both directions of rotation, as indicated schematically by a double arrow in the FIGURE.

The pump 32 has a first pump port 35A and a second pump port 35B. The first pump port 35A is connected to a clutch cooling circuit 36, which is set up to supply the clutch arrangement 14 with coolant. In this case, the first pump port 35A is furthermore connected to the clutch cooling circuit 36 via a first check valve 38. The first pump port 35A is connected to a low pressure section, such as a tank 42, via a first suction valve 40 in the form of a spring-loaded check valve.

The cooling arrangement 30 furthermore has a second cooling circuit, which comprises a transmission cooling circuit 44 and an electric motor cooling circuit 45 in the present case. The second cooling circuit is connected to the second pump port 35B via a second check valve 46. The second pump port 35B is furthermore connected to the low pressure section 42 via a second suction valve 48 in the form of a spring-loaded check valve.

A first orifice 50 is provided in the region of the inlet of the clutch cooling circuit 36. A second orifice 52 is provided in a corresponding manner in the region of the inlet of the second cooling circuit 44, 45. The first clutch cooling circuit 36 and the second cooling circuit 44, 45 are connected to one another via a cooling circuit connection 53. The cooling circuit connection 53 has an orifice arrangement 54. The orifice arrangement 54 comprises a first branch 56 and a second branch 58 parallel to the latter. A third orifice 60 is arranged in the first branch 56. A fourth orifice 62 and a check valve 64 are arranged in series in the second branch 58.

A cooler 66 is connected via the second orifice 52. The second cooling circuit 44, 45 furthermore comprises a bypass filter 68, which is connected in a bypass circuit leading to the electric motor cooling circuit 45.

During operation, the cooling arrangement 30 is either operated in such a way that the pump electric motor 34 is operated in a first direction of rotation, in which the first pump port 35A is a pressure port and the second pump port 35B is a suction port. In this case, the pump 32 draws in hydraulic fluid via the second suction valve 48. The second check valve 46 prevents coolant from being drawn in from the second cooling circuit 44, 45. A first main volume flow 72 of coolant, e.g. automatic transmission fluid, is thereby made available on the pressure side at the first pump port 35A. The first suction valve 40 prevents some of this first main volume flow from getting back into the low pressure section 42. The first check valve 38 opens, with the result that the first main volume flow 72 is fed primarily in the form of a clutch volume flow 74 through the first orifice 50 to the clutch arrangement 14. A first branch node 75, at which the cooling circuit connection 53 is connected, is provided between the first check valve 38 and the first orifice 50. Consequently, a first branch volume flow 76 flows toward the orifice arrangement 54. In this direction of flow, the check valve 64 in the second branch 58 opens, with the result that fluid flows through the third orifice 60 and the fourth orifice 62 toward a second branch node 78, which is connected between the second check valve 46 and the second orifice 52. From there, the first branch volume flow 76 is divided between a volume flow toward the second cooling circuit 44, 45 and a volume flow toward the cooler 66. After the second orifice 52 in the direction of flow, another node is provided, at which, on the one hand, the transmission cooling circuit 44 is connected and at which, on the other hand, the electric motor cooling circuit 45 is connected, with the result that the volume flow flowing back through the second orifice 52 and out of the cooler 66 is distributed between the transmission cooling circuit 44 and the electric motor cooling circuit 45. A high oil purity is ensured here by means of the bypass filter 68.

Fluid flowing back from the clutch cooling circuit 36, from the transmission cooling circuit 44 and from the electric motor cooling circuit 45 in each case passes into the low pressure section 42, from where the coolant can be drawn in again The size or cross sections of the orifices 50, 52, 60, 62 are matched to one another in such a way that the first branch volume flow 76 is significantly less than the clutch volume flow 74.

This ensures that a majority of the first main volume flow 72 made available by the pump 32 can be used to cool the clutch arrangement 14, whereas the smaller portion of this first main volume flow can be used to maintain lubrication in the transmission 16 and/or to cool the coolant. It is thereby possible to ensure that the waste energy can be dissipated by the cooler 66 even in the case of frequent use of the clutch arrangement 14 in rapid succession (e.g. in the case of relatively frequent hill starts).

The magnitude of the first main volume flow 72 can furthermore be adjusted by changing the rotational speed of the pump electric motor 34, e.g. to a small or to a large volume flow, depending on requirements.

In the second direction of rotation of the pump electric motor 34, fluid is drawn in from the low pressure section 42 via the first suction valve 40, the first check valve 38 preventing fluid from being drawn in from the clutch cooling circuit 36. In this case, a second main volume flow 80 is set up in the region of the second pump port 35B. The second suction valve 48 prevents some of this second main volume flow 80 from getting back into the low pressure section 42. The second check valve 46 is then open. In the region of the second branch node, the first main volume flow 80 is divided between a volume flow flowing through the second orifice 52 and a cooler volume flow 84 flowing into the cooler 66. Some of the second main volume flow 80 is furthermore fed to the orifice arrangement 54 in the form of a second branch volume flow 82. In this direction of flow, the check valve 64 shuts off in the second branch 58, with the result that the second branch volume flow 82 flows exclusively through the third orifice 60 and passes to the first branch node 75, from where it is fed to the clutch cooling circuit 36 via the first orifice 50 of the clutch arrangement.

That portion of the second main volume flow 80 which flows through the second orifice 52 and the return flow from the cooler 66 are divided between a transmission volume flow 86 and an electric motor volume flow 88.

In the second direction of rotation, the second main volume flow 80 serves primarily to lubricate component elements of the transmission 16. Since gearing of the transmission 16 is permanently in engagement during the operation of the vehicle, this second state, in which the pump electric motor 34 rotates in the second direction of rotation, is preferably set up permanently. At the same time, however, the pump electric motor 34 can be driven at a low rotational speed since the volume flow required in the transmission 16 is generally relatively small. If the electric drive motor 22 also has to be supplied with coolant, e.g. in the case of a purely electric driving mode, the rotational speed of the pump electric motor 34 can be increased. In both cases, a very small second branch volume flow 82 flows toward the clutch cooling circuit 36. The second branch volume flow 82 is preferably smaller than the first branch volume flow 76 (at the same rotational speed of the pump drive motor 34).

During gear shifts, it may also be possible to switch the pump electric motor 34 off completely. The second main volume flow 80 is thereby stopped completely, thus enabling drag torques in the transmission 16 to be reduced.

In some driving situations, it is furthermore necessary simultaneously to supply both the clutch cooling circuit 36 and the other cooling circuits 44 and/or 45 with coolant. In this case, it is preferred if the pump electric motor changes its direction of rotation at a frequency in a range of from 1/10 Hz to 7 Hz.

Virtually continuous supply to all the cooling circuits can thereby be achieved.

The invention claimed is:

1. A drive train cooling arrangement for cooling a first subassembly of a drivetrain of a motor vehicle and for cooling a second subassembly of the drivetrain, comprising:
   a first cooling circuit by which the first subassembly is cooled,
   a second cooling circuit by which the second subassembly is cooled, and
   a pump arrangement, by means of which coolant for cooling the first and second subassemblies can be fed to the first and second cooling circuits,
   wherein the pump arrangement has a bidirectional pump, which has a first pump port and a second pump port and which can be driven by a pump electric motor,
   wherein the first pump port is connected to the first cooling circuit, the second pump port is connected to the second cooling circuit, a first coolant volume flow is supplied to the first cooling circuit when the bidirectional pump is driven in a first direction of rotation, and a second coolant volume flow is supplied to the second cooling circuit when the bidirectional pump is driven in a second direction of rotation,
   wherein the first and second coolant volume flows can be adjusted by changing the rotational speed of the pump electric motor, and
   wherein one of the first and second pump ports is connected to a low-pressure section via a respective suction valve, so that one of the first and second pump ports is configured as a suction port, depending on the direction of rotation, and coolant can be drawn from the low-pressure section via the respective suction valve.

2. The cooling arrangement as claimed in claim 1, wherein at least one of the first and second cooling circuits is connected to its respective pump port via a check valve.

3. The cooling arrangement as claimed in claim 1, wherein the first and second cooling circuits are connected to one another via an orifice arrangement.

4. The cooling arrangement as claimed in claim 3, characterized in that the orifice arrangement has at least one check valve.

5. The cooling arrangement as claimed in claim 4, wherein the orifice arrangement has two parallel branches, wherein the at least one check valve is arranged in at least one of the branches and wherein an orifice is arranged in at least one of the branches.

6. The cooling arrangement as claimed in claim 1, wherein the first cooling circuit has a clutch cooling circuit.

7. The cooling arrangement as claimed in claim 1, wherein the second cooling circuit has at least one of a transmission cooling circuit and an electric motor cooling circuit.

8. The cooling arrangement as claimed in claim 1, wherein the second cooling circuit is connected to the second pump port via a coolant cooler.

9. The cooling arrangement as claimed in claim 1, wherein at least one of first and second cooling circuits has a bypass filter.

10. The cooling arrangement as claimed in claim 1, wherein the pump electric motor is configured to change a direction of rotation at a frequency in a range of from 0.1 Hz to 7 Hz during operation of the pump electric motor.

11. A method for operating a drive train cooling arrangement having a bidirectional pump, a pump electric motor which drives the bidirectional pump, and first and second cooling circuits, the method comprising the steps of:
- feeding coolant to the first and second cooling circuits of the drive train cooling arrangement with the bidirectional pump, the bidirectional pump having a first pump port and a second pump port, the first pump port is connected to the first cooling circuit and the second pump port is connected to the second cooling circuit, and
- adjusting a coolant volume flow which is provided to the first and/or the second cooling circuit by changing the rotational speed of the pump electric motor, and
- changing the direction of rotation of the pump electric motor at a frequency in a range of from 0.1 Hz to 7 Hz.

12. The method of claim 11, wherein at least one of the first and second pump ports is connected to a low-pressure section via a suction valve.

13. The method of claim 11, wherein the direction of rotation of the pump electric motor is repeatedly changed during operation such that the first and second cooling circuits are fed with coolant simultaneously.

* * * * *